United States Patent [19]
Wilson, Jr.

[11] 4,416,436
[45] Nov. 22, 1983

[54] AERIAL TRANSPORT OF PAYLOADS WITH VERTICAL PICK UP AND DELIVERY

[75] Inventor: Francis M. Wilson, Jr., Kennesaw, Ga.

[73] Assignee: Lockheed Corporation, Burbank, Calif.

[21] Appl. No.: 314,254

[22] Filed: Oct. 23, 1981

[51] Int. Cl.³ .............................................. B64D 1/22
[52] U.S. Cl. ............................ 244/137 R; 244/138 R; 258/1.4
[58] Field of Search .................. 244/1 R, 2, 3, 1 TD, 244/137 R, 138 R; 258/1.4

[56] References Cited

U.S. PATENT DOCUMENTS

| | | | |
|---|---|---|---|
| 1,829,474 | 10/1931 | Chilowsky | 244/137 R |
| 2,295,537 | 9/1942 | Anderson | 258/1.4 |
| 2,298,912 | 10/1942 | Alabrune | 244/137 R |
| 2,373,086 | 4/1945 | Alabrune | 244/137 R |
| 3,351,325 | 11/1967 | Cotton | 244/137 R |
| 3,724,817 | 4/1973 | Simons | 244/137 R |

FOREIGN PATENT DOCUMENTS

| | | | |
|---|---|---|---|
| 865643 | 5/1941 | France | 244/1 TD |
| 909198 | 5/1946 | France | 244/137 R |

Primary Examiner—Charles E. Frankfort
Attorney, Agent, or Firm—John J. Sullivan

[57] ABSTRACT

Two airplanes (A and B) combine in aerial maneuvers to accomplish pick up, transport and delivery of a payload (10) from and to designated surface locations (11). The payload (10) is connected to, carried in the open by and disconnected from the ends of cables (15) extending from each airplane during the aerial maneuvers. Such airplane maneuvers include orbiting 180° apart while banking at prescribed angles to effect substantially vertical lifting and lowering of the payload (10) relative to the pick up and delivery surfaces (11).

8 Claims, 6 Drawing Figures

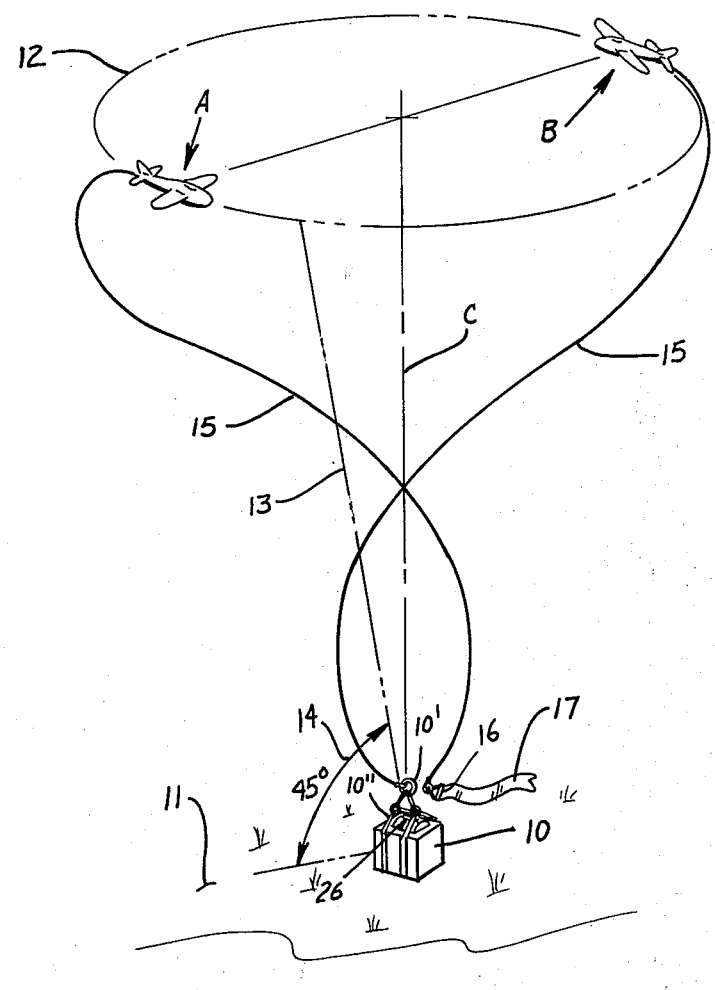
*Fig_1*
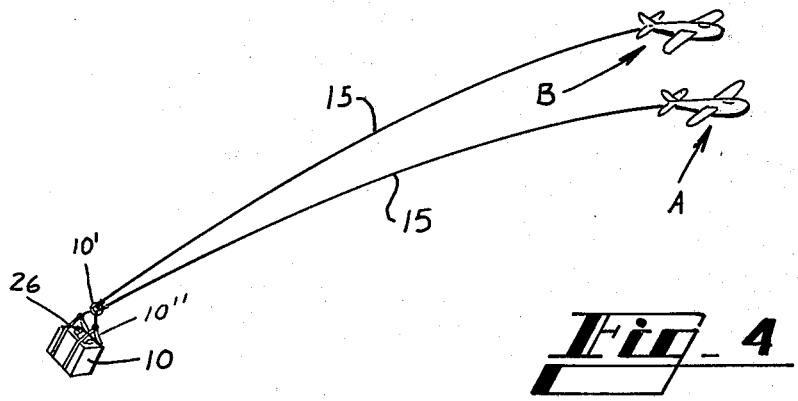
*Fig_4*

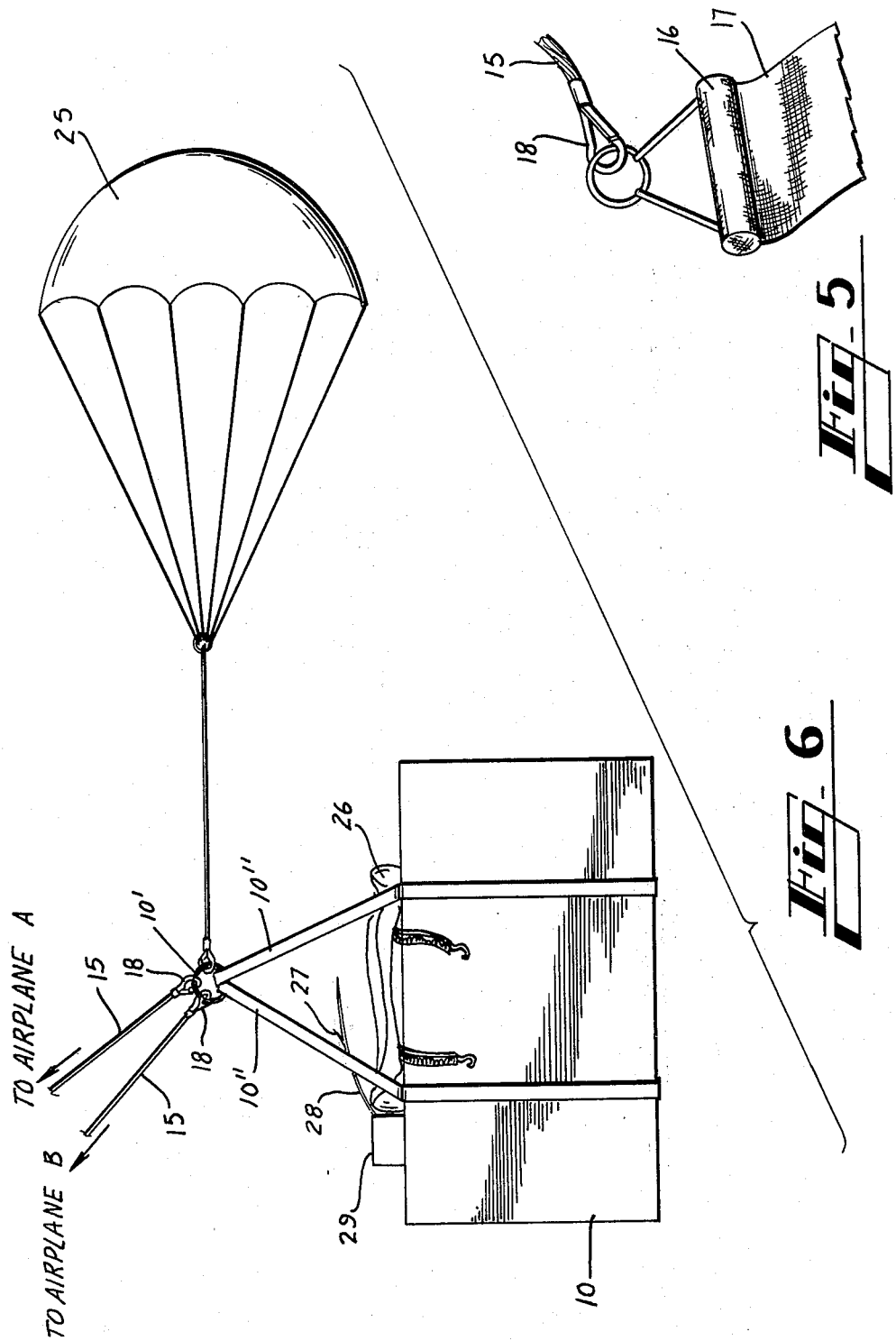

4,416,436

AERIAL TRANSPORT OF PAYLOADS WITH VERTICAL PICK UP AND DELIVERY

Technical Field

This invention relates generally to the art of aerial transport of payloads and more particularly to aerial transport of payloads facilitated by vertical pick up and vertical delivery by aircraft while in flight whereby significantly larger payloads than heretofore possible are transportable for distances comparable to those of conventional transport aircraft.

For tactical and/or various emergency situations, it has long been recognized that the capability for vertical pick up and delivery of payloads or cargo by aircraft is desirable. However, the inherent reduction in efficiency and increased cost of a cargo airplane occasioned by the inclusion of provisions for vertical take off and landing (VTOL) have thus far precluded the development of a successful VTOL cargo airplane to meet the above needs. This invention allows conventional cargo aircraft to meet these needs in the transport and vertical handling of operationally significant payloads.

BACKGROUND ART

Helicopters currently provide the only practical means for vertical transport of payloads. So called "long line" pick up techniques have been employed but only small amounts of weight, i.e. a few hundred pounds, may be picked up by any size of aircraft. Illustrative of the long line concept are the following U.S. Pat. Nos.:

1,829,474—issued Oct. 27, 1931 to Chilowsky
3,351,325—issued Nov. 7, 1967 to Cotton
3,724,817—issued Apr. 3, 1973 to Simons More in point, and the closest known prior art to the invention herein, is the Alabrune U.S. Pat. No. 2,298,912 which envisions two aircraft flying in a circle or in orbit with a payload suspended between them. That is the simple or non-critical part of the procedure. The significant part is the transaction maneuver required to enter and to exit the orbit. Successful solution of this problem according to the present invention is crucial to obtaining a practical, useful system.

Alabrune proposes to have one of his two aircraft in orbit accelerate with relation to the other so as to gain on it. The payload is thereby caused to follow a spiral path beginning at the center of the orbit circle and converging onto the orbit track. This is objectionable for several reasons.

To begin with, the required time in orbit with the payload off the ground is excessive. Payload dynamics cause it not to follow the idealized spiral path at all but to swing away from center. Also aircraft dynamics caused by crosswind or pilot induced small departures from the optimum orbit path introduce oscillations into the payload path causing it to gyrate widely and inducing large inertial loads onto the payload, the cables, and the aircraft.

In addition, it is most desirable to have the orbit and de-orbit maneuvers occur with dispatch in order to reduce the vulnerability of the aircraft to attack, where the system is used in an enemy environment, as well as to reduce pilot workload in flying this very demanding procedure. Moreover, the de-orbit maneuver should be executed in a manner to cause the payload to lift off the ground swiftly in a near vertical direction to avoid the dangers associated with a slow lift off. An example of such dangers are payload bouncing on the ground perhaps repeatedly in various places before finally being fully airborne, imposing hazards to ground personnel and to the payload.

It is desirable that the airplanes in orbit fly as slowly as possible in order to minimize the orbit radius. This is necessary to reduce the amount of cable extended and to allow the flight crew to be able to see both the payload and the other airplane in orbit to maintain proper station. At a given, reasonable bank angle and load factor, the orbit radius increases as the square of the airspeed. However, the amount of weight that the wings and the airplane can sustain (airplane plus payload) also varies directly as the square of the airspeed. Hence there exists an optimum orbital airspeed for each mission, as low as possible to minimize orbit radius, yet high enough to sustain the weight of the airplane plus payload with adequate stall margin.

The Alabrune invention requires that the aircraft fly at dissimilar speeds during the de-orbit and re-orbit maneuvers. This results in the requirement that the cargo be sustained while the aircraft are operating at non-optimum orbiting conditions, thus inherently limiting the payload to a lesser value than can be handled by the present invention.

DISCLOSURE OF INVENTION

In accordance with the present invention two airplanes are dispatched to pick up a payload, such as for example a cargo module, to which vertical access is provided. Upon arrival approximately five hundred to twenty-five hundred (500–2500) feet over the module, the airplanes begin orbiting around it at about their best landing approach airspeed and at a bank angle of about 30 to 40 degrees. Using established "long line" techniques each airplane pays out a cable with a suitable small weight or drogue attached such that the end of the cable descends to the module while the airplanes remain in orbit. Ground personnel attach each cable to the module and direct by appropriate signal (hand, radio, etc.) the airplanes to ascend.

The airplanes first climb while remaining in orbit, then execute a de-orbiting maneuver such that they arrive at the position of flying side by said in the same direction. The procedure for de-orbiting requires only one revolution or less of the orbiting airplanes and causes the module to accelerate almost vertically immediately upon initiation of the procedure. The transition is complete in a matter of 30 to 60 seconds, depending on the characteristics of the airplanes involved, and undesirable payload dynamics never have the opportunity to develop. The same is true of the re-orbit maneuver.

The airplane which first departs from the steady orbital conditions does so at a constant airspeed and at reduced bank angle on the order of half its orbital value i.e. 15 to 20 degrees, therefore with increased stall margin over that of the other airplane. Hence, the de-orbit maneuver is accomplished with the airplanes at all times operating in a less critical flight regime than is involved in the orbit itself.

The airplanes flying side by side in the same direction proceed to their destination, execute a reorbiting maneuver over the destination and descend at a controlled rate to lower the module to its delivery point. Ground personnel detach the lifting and lowering cables which are reeled back aboard each airplane. The mission is complete and the airplanes may now proceed to their next mission or return to their base.

BRIEF DESCRIPTION OF DRAWINGS

The details of this invention will be described in connection with the accompanying drawings in which FIG. 1 is a perspective view showing two airplanes in orbit over and around a payload or cargo module on the ground or other surface and connected to one airplane and to be connected to the other airplane by cables or the like;

FIG. 4 is a perspective view-showing the two airplanes in normal flight with the cargo module being towed thereby;

FIG. 5 is a detail to show a fragment of each cable end and its associated drogue and connector element; and FIG. 6 is an enlarged view of the cargo module shown in FIG. 1 and the associated elements as these would appear during the delivery operation when the cargo module is being lowered to the delivery point.

BEST MODE FOR CARRYING OUT THE INVENTION

Figure 2:
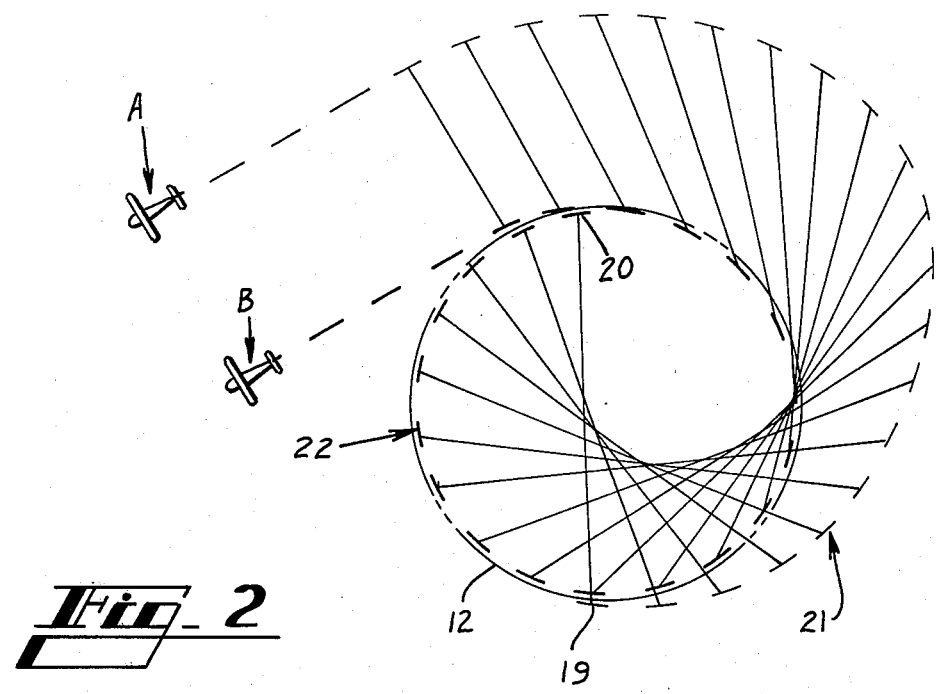
FIG. 2 is a plan view of the airplanes of FIG. 1 diagrammatically indicated in their several successive relative positions during their de-orbit maneuver (the airplanes leaving the orbit pattern), each relative position of the airplanes at a given time being connected by a straight line.

Referring more particularly to the drawings, two airplanes A and B fly to a desired pick up point for a payload, such as cargo module 10 located on the surface 11. The airplanes A and B begin to fly a circular path 12 (diameter about 1000–3000 feet) above the module 10, with the module 10 being approximately in the center C of the circle 12. The airplanes A and B are disposed approximately 180° apart in the circle 12 and at an altitude such that a straight line 13 drawn from the module 10 to any point on the circle 12 is at an angle 14 of about 45° from the horizontal, i.e. the surface 11.

Each airplane A and B extends a cable 15 behind it with a weight in the form of a metal bar 16 or the equivalent and a drogue 17 connected to the end of each cable 15 by a releasable hook 18 for example. As the cable extension continues to an ultimate length of about 1000 to 4000 feet, the drogues 17 descend and move toward the center C of the circle 12 until they are on the surface 11. Sufficient slack is present in the cables 15 to make handling of the drogues 17 and the ends of the cables by the ground personnel convenient and safe.

After the ground personnel remove the drogues 17 and secure the end of each cable 15 to the module 10 resting on the surface 11 as for example by connection of a snaphook 18 at the end of each cable 15 in a ring 10' carried by straps 10" extending from the payload 10, each airplane A and B ascends. The module 10 is thereby lifted a safe distance above the surface 11 preparatory to initiating the de-orbit maneuver.

At the start of this maneuver the airplanes A and B are in orbit circling at a bank angle of about 30° to 40° (diameter about 1000 to 3000 feet) at the positions 19 and 20 respectively (FIG. 2). Airplane A now reduces its bank angle by about 15° to 20° such that it moves to describe a flight path 21 about the pick up point at a radius approximately twice that of airplane B which continues to fly at the original radius 22. This results in airplane B rapidly gaining (in vector position from the pick up point) on airplane A. The module 10 rapidly rises and begins accelarating to the aircraft flight speed. Within approximately one orbit or less of airplane B, the two airplanes A and B become positioned in side by side formation with the module 10 trailing behind, between and below them (FIG. 4). No change in the airspeed of either airplane A or B occurs during this maneuver.

Airplanes A and B climb to an appropriate cruise altitude and continue to the delivery point or destination for the module 10. During this flight the cables 15 are reeled in to bring the module 10 to a minimum drag position with relation to the airplanes A and B which continue in side by side formation.

Figure 3:
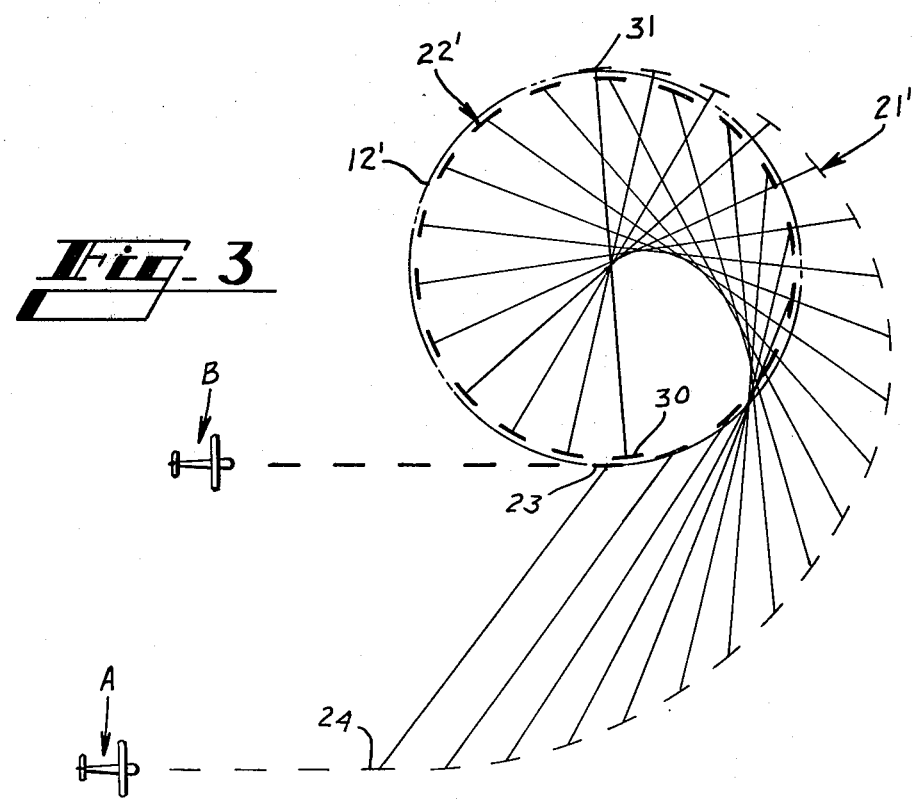
FIG. 3 is a view similar to FIG. 2 showing the airplanes in their several successive relative positions during their re-orbit maneuver (the airplanes entering the orbit pattern)

Upon arrival at the destination the airplanes A and B descend to an appropriate altitude of approximately 500 to 2500 feet and begin their re-orbit maneuver (FIG. 3). The cables 15 are re-extended from each airplane A and B to approximately their original length i.e. 1000 to 4000 feet. The airplanes A and B approach the module delivery point such that airplane B passes approximately one orbit radius to the side of the point with airplane A an additional orbit diameter in distance from the point, airplane B leading airplane A by about 100–300 feet.

As airplane B comes tangent to the orbit circle 12' i.e. position 23, it immediately banks about 30° to 40° to establish itself into orbit at the appropriate radius (about 500 to 1500 feet). At the same time airplane A in position 24 banks about 15° to 20° to establish a flight path 21' approximately twice that of airplane B and begins to converge onto the orbit circle 12'. A drag device, such as for example a small parachute 25 affixed to the module 10 is deployed and the module 10 begins to decelerate and move towards the center of the orbit circle 12'.

More specifically, the parachute 25 is secured to the top of the module 10, being enclosed within a pack 26 in standard or conventional manner. The flaps of the pack 26 are closed and held by a pin 27 connected to the end of rip cord 28. The other end of the ripcord 28 connected to a radio operated actuator 29 so that upon radio signal from one of the airplanes A or B for example, the pin 27 is pulled to open the pack 26 allowing the airstream to deploy the parachute 25.

After approximately one orbit or less of airplane B, it reaches position 30 as airplane A reaches position 31. At this point airplane A increases its bank angle to match that of airplane B to establish its subsequent flight path along the orbit circle 12', 180° displaced from the position of airplane B. The module 10 has proceeded to approximately the center of the orbit circle 12'. Both airplanes A and B now simultaneously descend about an additional 100 feet whereby the module 10 is slowly deposited onto a surface equivalent to the surface 11 and to provide slack in the cables 15.

The cables 15 are now detached from the ring 10' either by ground crew or by remote control of some conventional kind. The airplanes A and B ascend, reel in their respective cables 15 and return to their base in a conventional fashion.

With the above described technique, payloads such as the module 10, of up to the order of 0.1 the combined gross weight of the two airplanes A and B can be handled. The payload may be of any aerodynamic shape ranging from that of a box, like module 10, or a land vehicle such as a tank, to that of a lower drag configuration such as a glider aircraft. Other elements of sophistication such as precision navigation and station keeping electronic gear all within the state of the art may be incorporated in the airplanes A and B to increase the effectivity of the system.

I claim:

1. In the aerial transportation of a payload the method of vertical pick up and delivery of such payload from a surface by two airplanes in flight comprising the steps of: flexibly connecting said payload to each said airplane while flying at substantially the same altitude and at a predetermined bank angle in a substantially circular first orbit around and above said payload; causing said airplanes to move at approximately the same speed and to be diametrically opposite one another while initially lifting said payload from said surface; causing one of said airplanes to reduce its bank angle while maintaining said speed whereby said one airplane describes a flight path at a radius approximately twice that of the other airplane and the two airplanes become positioned in side by side formation within approximately one circle of said other airplane with said payload trailing, between and below said airplanes; subsequently causing said airplanes to descend to a predetermined altitude above a selected delivery point for said payload with the airplane nearer to said point at a selected bank angle to locate it a predetermined distance to the side of said point and the airplane farther from said point at a selected bank angle to locate it approximately twice the distance from said point as, and trailing, said nearer airplane; causing said nearer airplane to increase its bank angle to commence a substantially circular second orbit around and above said point while simultaneously causing said farther airplane to commence a flight path approximately twice that of said nearer airplane, both airplanes moving at approximately the same speed; causing said farther airplane to gradually increase its bank angle so that it converges with the aforesaid circular second orbit of said nearer airplane at about the time said nearer airplane completes approximately one circle and the two airplanes become approximately diametrically opposite one another in said circular second orbit; and then causing the two airplanes to simultaneously descend while maintaining approximately the same speed until said payload reaches said delivery point.

2. In the aerial transportation of a payload the method comprising the steps of: flexibly connecting said payload while at rest on a surface to each of two airplanes while flying at substantially the same altitude and at the same selected bank angle in a substantially circular orbit around and above said payload; causing said airplanes to move at approximately the same speed and to be diametrically opposite one another while initially lifting said payload from said surface; and causing one of said airplanes to reduce its bank angle while maintaining said speed whereby said one airplane describes a flight path at a radius approximately twice that of the other airplane and the two airplanes become positioned in side by side formation within approximately one circle of said other airplane with said payload trailing, between and below, said airplanes.

3. The invention of claim 2 wherein said orbit is a circle of about 1000 to 3000 feet in diameter with said payload being approximately in the center of said circle and said altitude is such that a straight line drawn from the said payload to any point on said circle is at an angle of about 45° from said surface.

4. The invention of claim 3 wherein each said airplane is connected to said payload by a cable having a length of about 1000 to 4000 feet.

5. The invention of claim 2 wherein said selected bank angle is approximately 30° to 40° and said reduced bank angle is about 15° to 20°.

6. In the aerial transportation of a payload the method comprising the steps of: towing said payload when flexibly connected to each of two airplanes flying approximately side by side at approximately the same speed; causing said airplanes to descend to a predetermined altitude above a selected delivery point for said payload with one of said airplanes at a selected initial bank angle to locate it a predetermined distance to the side of said point and the other of said airplanes at a selected initial bank angle to locate it approximately twice the distance from said point as, and trailing, said one airplane; causing said one airplane to increase its bank angle to thereby commence a circular orbit around and above said point while simultaneously causing said other airplane to commence a flight path approximately twice that of said one airplane, both airplanes moving at approximately the same speed; causing said other airplane to gradually increase its bank angle so that it converges with the aforesaid circular orbit of said one airplane at about the time said one airplane completes approximately one circle and the two airplanes become approximately diametrically opposite one another in said circular orbit; and then causing the two airplanes to simultaneously descend while maintaining approximately the same speed until said payload reaches said delivery point.

7. The invention of claim 6 wherein said one airplane's circular orbit is a circle about said delivery point having a radius of about 500 to 1500 feet.

8. The invention of claim 6 wherein said predetermined altitude is approximately 500 to 2500 feet, each airplane is connected to said payload by a cable having a length of about 1000 to 4000 feet and said initial bank angle of said one airplane is about 15° to 20° while said initial bank angle of said other airplane is about 30° to 40°.

* * * * *